Jan. 11, 1955  J. C. TROTTER ET AL  2,699,300
AIRCRAFT WITH ADJUSTABLE SWEPT-BACK WINGS
Filed April 20, 1950 4 Sheets-Sheet 1
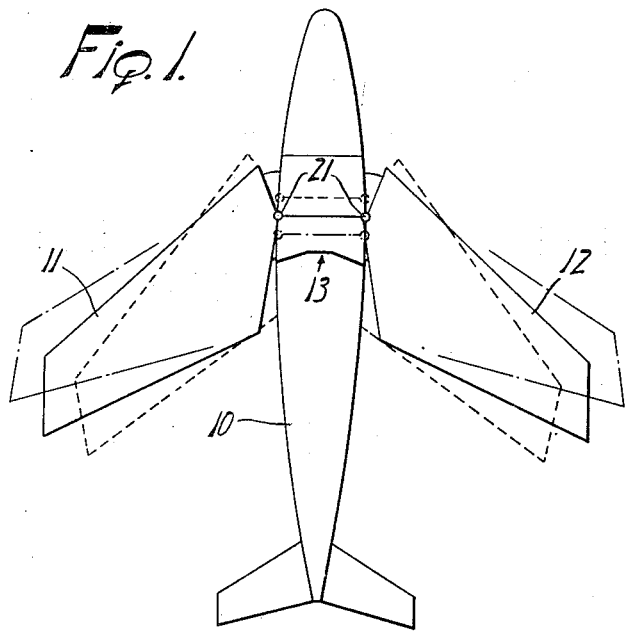
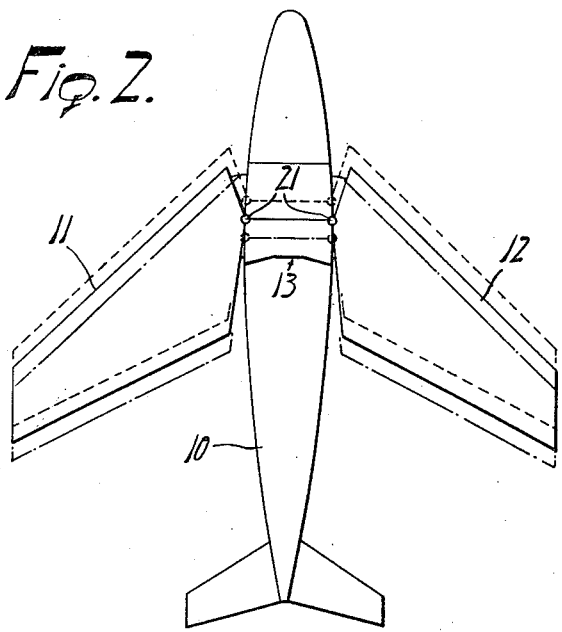
INVENTORS
John C. Trotter &
Robert H. Dufort
BY
Bean, Brooks, Buckley & Bean
ATTORNEYS

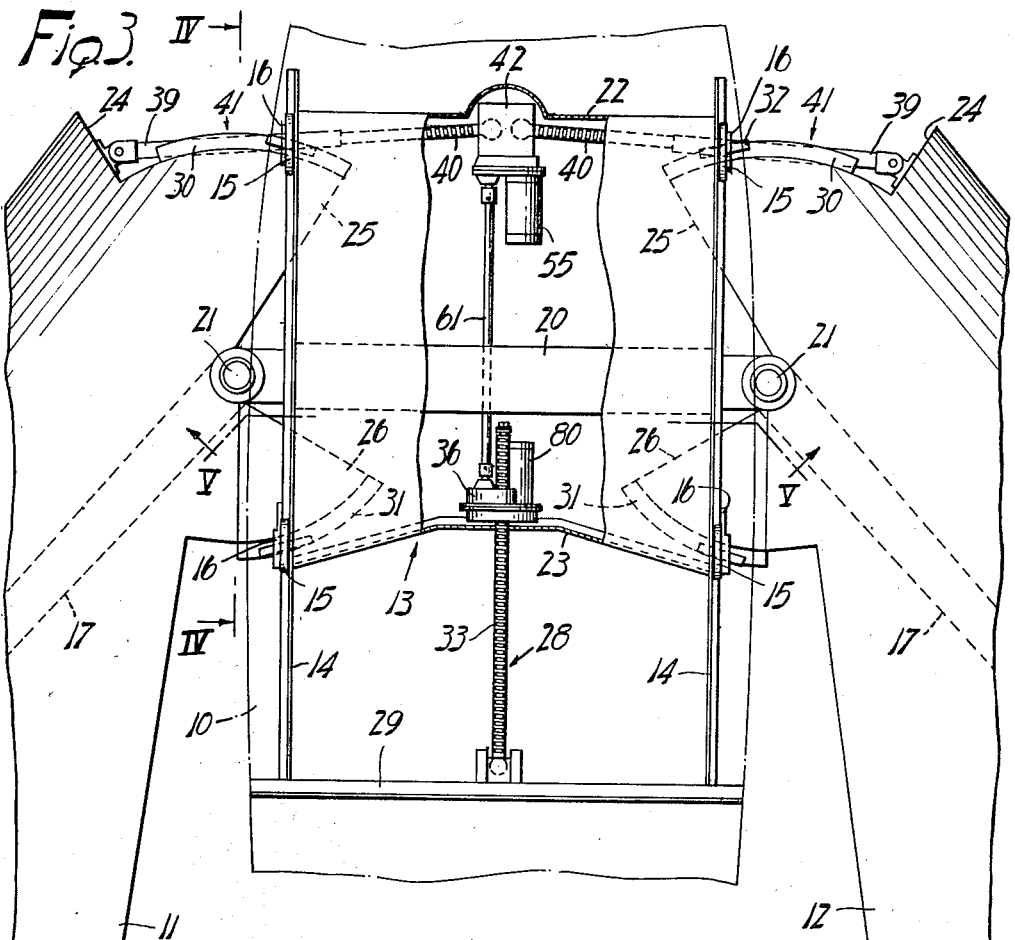
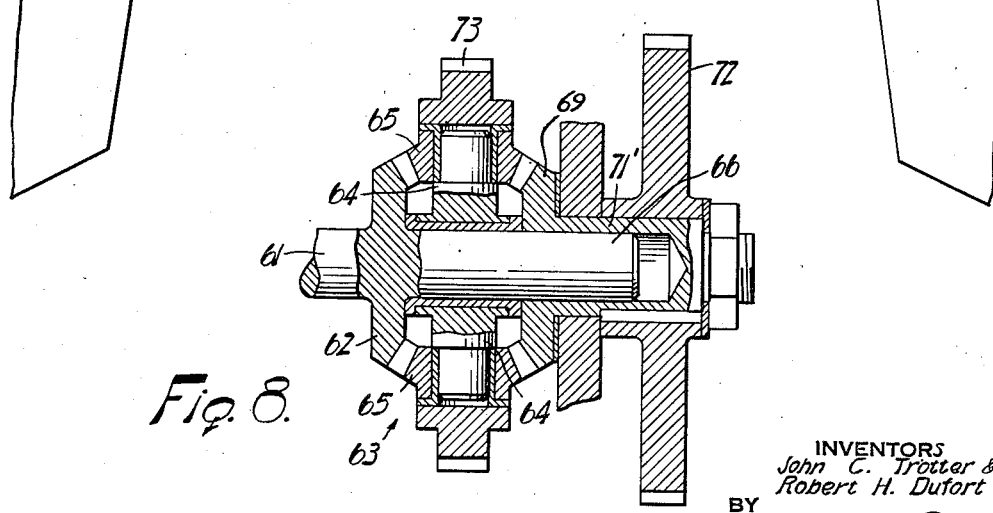

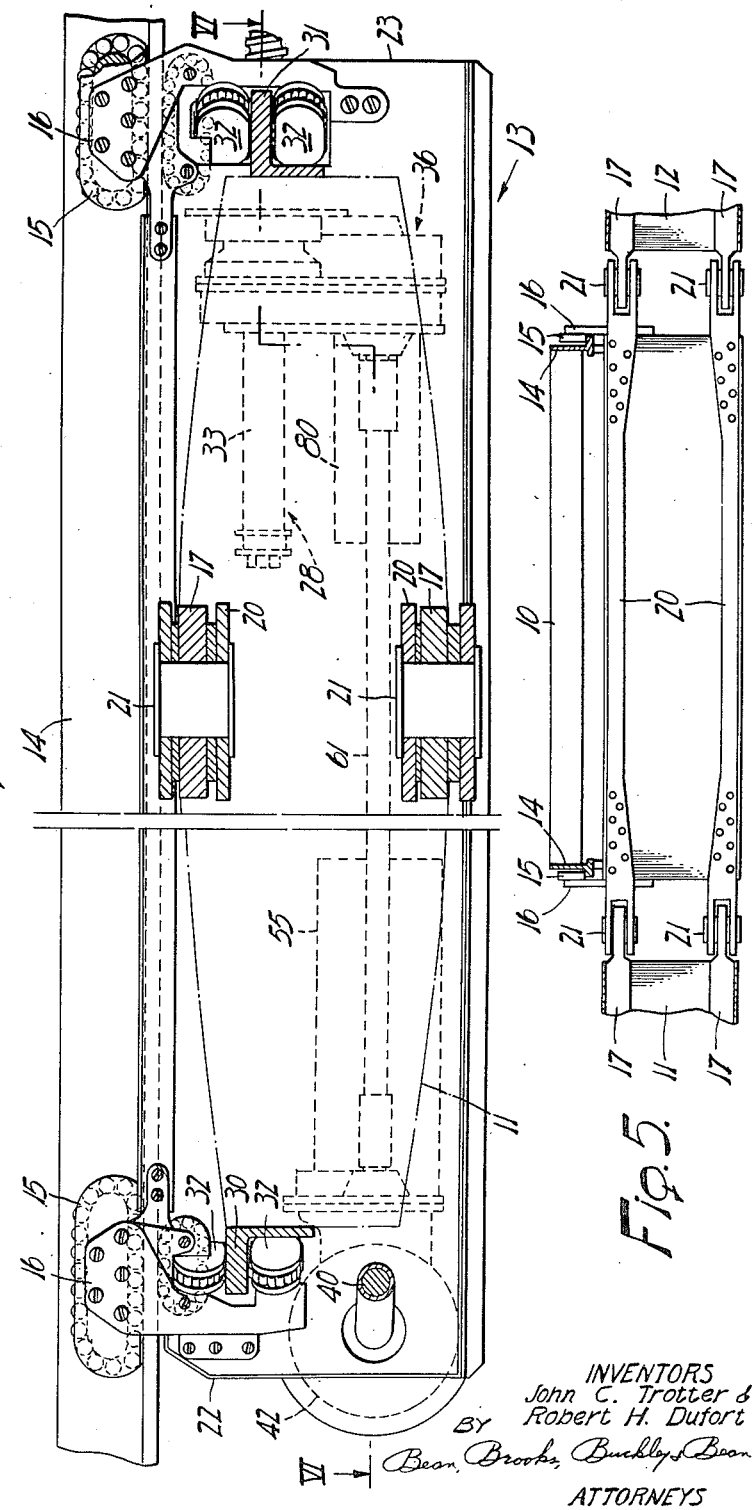
Jan. 11, 1955     J. C. TROTTER ET AL     2,699,300
AIRCRAFT WITH ADJUSTABLE SWEPT-BACK WINGS
Filed April 20, 1950     4 Sheets-Sheet 3
INVENTORS
John C. Trotter &
Robert H. Dufort
ATTORNEYS Jan. 11, 1955     J. C. TROTTER ET AL     2,699,300
AIRCRAFT WITH ADJUSTABLE SWEPT-BACK WINGS
Filed April 20, 1950     4 Sheets-Sheet 4
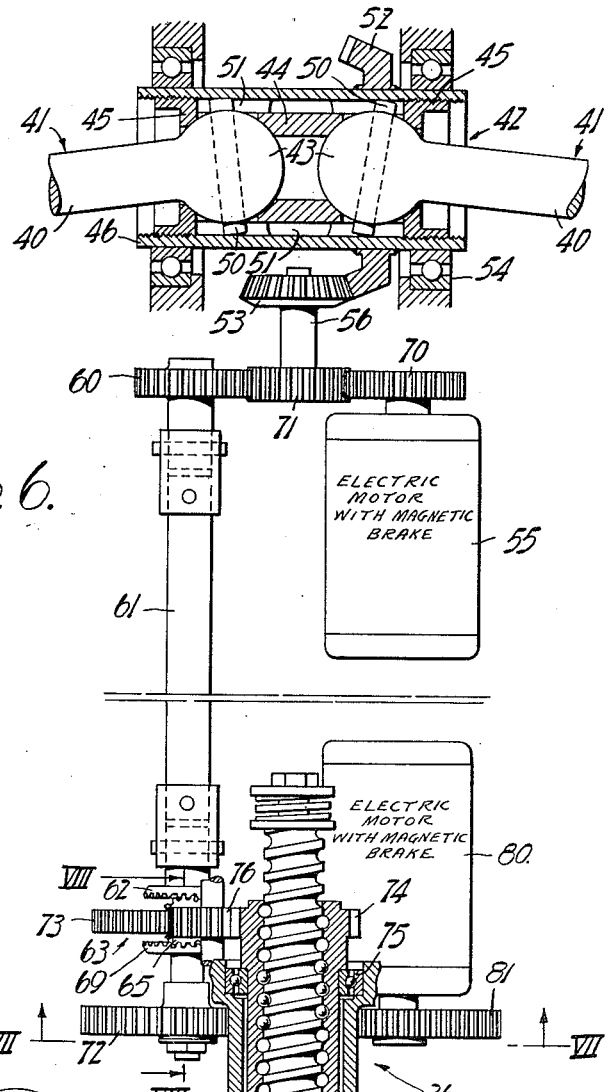
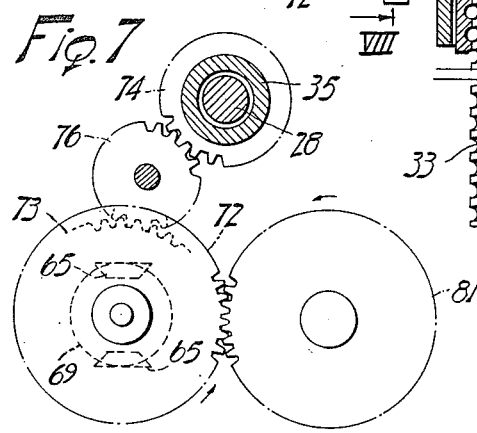
INVENTORS
John C. Trotter &
Robert H. Dufort
BY
Bean, Brooks, Buckley & Bean
ATTORNEYS United States Patent Office 2,699,300
Patented Jan. 11, 1955

2,699,300

AIRCRAFT WITH ADJUSTABLE SWEPT-BACK WINGS

John C. Trotter, Williamsville, and Robert H. Dufort, Kenmore, N. Y., assignors to Bell Aircraft Corporation, Wheatfield, N. Y.

Application April 20, 1950, Serial No. 157,086

10 Claims. (Cl. 244—46)

Our invention relates in general to airplanes, and in particular to airplanes having pivotally mounted wings and to means for adjusting the sweepback of the wings.

The principal object of our invention is to provide improved means for changing the sweepback angle of the wings of an airplane and for maintaining the aerodynamic balance of the airplane during and after such sweepback adjustment is made.

Another object is to provide a center wing section upon which the wings are pivotally mounted, said section being movable relatively to the fuselage as the sweepback angle of the wings is altered, whereby the center of pressure of the wings is maintained approximately in line with the center of gravity of the airplane.

Furthermore, it is an object to provide an improved device to synchronize the movement of the outer wing panels and the center wing section carrying the same whereby the center of pressure will be maintained substantially at the longitudinal station of the center of gravity of the airplane.

Furthermore, our invention is of such a nature that the center of pressure of the wings may be adjusted without having to alter the wing sweepback angle or to otherwise affect the angularity of the wing panels.

Furthermore, it is an object to provide separate actuating motors and to connect the motors together in such a manner that one motor may be used to actuate the wings to adjust the sweepback angle which substantially maintains the aerodynamic stability or balance of the airplane and the other motor used to move the center section independently of the sweepback angle adjustment.

The above objects and advantages have been accomplished by the device shown in the accompanying drawings, of which:

Fig. 1 is a diagrammatic plan view of an airplane showing the wings located at various adjusted sweepback angles;

Fig. 2 is a similar view showing the wings adjusted to fore and aft positions while maintaining a common adjusted sweepback angle;

Fig. 3 is an enlarged fragmentary plan view showing the wing mounting and means for actuating the same;

Fig. 4 is an enlarged transverse sectional elevation taken on line IV—IV of Fig. 3;

Fig. 5 is a transverse sectional view of the center wing section taken on line V—V of Fig. 3;

Fig. 6 is an enlarged fragmentary sectional view showing the wing and center section actuating means;

Fig. 7 is a fragmentary end elevation of the center wing section actuating means taken on line VII—VII of Fig. 6; and, Fig. 8 is an enlarged sectional view taken through the differential gear means on line VIII—VIII of Fig. 6.

As illustrated in the drawings, the airplane fuselage is represented at 10, and the outer wing panels at 11 and 12. In Fig. 3, the fuselage 10 is shown for convenience of illustration in dot-and-dash lines; and in Fig. 4, the boundary of the wing section 11 is also shown in dot-and-dash lines.

The wing panels 11 and 12 are pivotally mounted upon and carried by a center wing section 13. This section is slidably supported upon the fuselage by being suspended from tracks 14 which are engaged by fuselage track bearings 15 carried by downwardly extending brackets 16. The center section is provided with carrythrough bars 20 which are preferably bifurcated and to which the wing beams 17 are pivotally attached by pivots 21. This wing section is preferably provided with a front wall 22 and with a rear wall 23.

The pivots 21 of the wings 11 and 12 are located at the root ends 24 of the wings and at points spaced rearwardly from the leading edges thereof. Extending inwardly from the root end of each wing are two wing segments 25 and 26 which are arranged on each side of the pivot point 21. Wing tracks 30 and 31 are arranged on the edges of the segments 25 and 26 respectively and each of these tracks are in concentric relation with the pivot 21 of the wing. Each of these segments and wing tracks are movable through a suitable opening formed in the side wall of the center wing section and the tracks are in engagement with wing track bearings 32 which are supported by the bracket 16 of the center section and which are engageable with the upper and lower surfaces of the wing tracks to thereby support the wings in their oscillating movements and thereby resist the torsional loads to which they are subjected. The bearings 15 and 32 may be of any desired and suitable type but preferably are of the ball or roller type mounted in an oval shaped race and having bearing engagement with the coacting surfaces.

As hereinbefore stated, the center wing section is movable longitudinally of the airplane fuselage upon the tracks 14, and a screwjack 28 is provided for moving this center section. This jack is provided with a screw 33, the outer end of which is pivotally attached to the lateral brace 29 of the fuselage. The opposite end of the jack screw passes through an adjusting nut 35 carried by a differential gear housing 36, to be hereinafter described further in detail.

The wings 11 and 12 are adjustable to various angles by means of screwjacks 41. The outer end 39 of each of these jacks is pivotally attached to the root end 24 of the wing and the inner end 40 thereof is mounted within a wing transmission 42. This wing transmission is carried by the center wing section and is movable therewith. The inner ends 40 of these screwjacks 41 are extended into this transmission and each is formed with a sphere 43 which is mounted in suitable socket members 44 and 45. The socket members are carried by a rotating sleeve 46 which is suitably mounted within the transmission 42. Each of the spheres or ball members 43 is provided with a driving pin 50 which is extended diametrically through the ball and perpendicular to the axis of the inner end of the jack. The ends of these drive pins are extended beyond the periphery of the ball or sphere and are mounted within slots 51 formed in the sleeve 46 whereby the inner ends of both jacks are driven by the sleeve. The sleeve carries a bevel gear 52 which meshes with a drive bevel gear 53. By means of the gears 52 and 53, the sleeve together with its associated parts is rotated within its bearings 54 which are carried by the housing of the transmission. An actuating motor 55 is carried by the wing transmission 42 and is connected to the shaft 56 upon which the gear 52 is mounted by means of gears 70 and 71. Suitable electrical connections, switch means and a source of power (not shown) are provided for causing the actuating motor 55 to be operated in either direction.

Since it is necessary to maintain the aerodynamic balance of the airplane under different adjustments of the sweep-back angles of the wings, it is necessary that the center of pressure of the wings be maintained substantially at the longitudinal station of the center of gravity of the airplane. To accomplish this, it is necessary that the wing pivots be moved as the sweepback angle is altered, and to bring this about the actuating motor 55 is also connected to the nut 35 of the screwjack 28 to cause its rotation. In order to accomplish the synchronous operation of all three screwjacks, a gear 60 is carried at the forward end of a shaft 61 and is in mesh with the gear 71 which is driven by the gear 70 carried by the actuating motor 55. The other end of the shaft 61 carries the bevel gear 62 of a gear differential 63, to be hereinafter described.

The shaft 61 is, of course, properly mounted in rotatable manner, and the bevel gear 62, together with the other gears 65 and 69 of the differential transmission 63 are suitably mounted and supported within the casing of the transmission. This transmission is provided with the usual spider 64 which carries the differential pinions 65. The spider may be supported in any desired manner but preferably by an extension 66 of the shaft 61 which supports the bevel gear 62. This shaft extension 66 preferably projects beyond the spider 64 and forms a partial support for the other differential bevel gear 69. This last mentioned bevel gear is provided with a sleeve 71' upon which is mounted a spur gear 72, to be hereinafter described. The spider 64 of the differential 63 carries a differential spur gear 73 which is connected by means of an idler gear 76 to a nut gear 74 carried by the nut 35 of the screwjack 28. The nut 35 is mounted within suitable anti-friction bearings 75 which not only support the nut for rotation but also keep it in axial alignment. Obviously, as the nut 35 is rotated, the screw of the jack 28 will be moved axially to accomplish the desired adjustment of the center wing section. After the sweepback angle of the wings has been established and the center of pressure accordingly altered by longitudinal movement of the wing pivots, it may be found necessary or desirable to shift the wings longitudinally or to change their position upon the fuselage to bring about a more perfect dynamic balance without altering the sweepback angle; and to accomplish this, I provide an auxiliary motor 80 which is connected to the spur gear 72 of the differential transmission by means of a gear 81. Both the actuating motor 55 and the auxiliary motor 80 are of the magnetic brake type so that when they are not being energized by a current of electricity, the armatures and shafts will be fixed. Therefore, when the auxiliary motor 80 is actuated to shift the longitudinal position of the center wing section, the actuating motor 55 will be locked in position, and, therefore, the bevel gear 62 will be prevented from rotating. However, since the differential gear 69 is free to rotate, the auxiliary motor 80 will cause the rotation of this gear and, through the differential pinion gears 65, the rotation of the differential spur gear 73 which will, through the idler gear 76 and nut gear 74, cause the rotation of the nut 35 to bring about the desired adjustment of the center wing section. In like manner, when the actuating motor 55 is energized to adjust the sweepback angle of the wings and to simultaneously adjust the longitudinal position of the center section, the auxiliary motor 80 will be locked in position and, therefore, the bevel gear 69 of the differential will be held stationary. Under these conditions, the bevel gear pinions 65 will be rotated about the stationary gear 69 and, by means of the bevel gear 62, cause the differential spur gear 73 to drive the nut gear 74 and to bring about the longitudinal adjustment of the wing section and the sweepback angle thereof. While the screw and nut parts of the screwjacks may have any suitable type of screwthreads, it is preferable to use screws and nuts having anti-friction ball races.

As hereinbefore stated, the actuating motor 55 and the auxiliary motor 80 are of the magnetic type and the armatures thereof are locked when the windings are not energized. Since these motors are connected to each other by the differential gearing shown and described, it is obvious that one may be actuated without actuating the other. When operating the actuating motor 55, one side of the differential gear will be locked by reason of the locked condition of the auxiliary motor, whereby all jack screws will be actuated from one source. When the actuating motor is de-energized, it is locked and then when the auxiliary motor is actuated, the other gear of the differential gear transmission is locked and the center section screwjack will thus be operated independently of the actuating motor and without altering the sweepback angle of the wings.

From the foregoing it will be obvious that the wings 11 and 12 may be adjusted to their maximum spread or open positions when traveling at slow speeds or when taking off and when landing. However, when traveling at high speeds, the wings may be rotated about their pivots to occupy positions at various sweepback angles for optimum performance as indicated by the speed of the airplane. Owing to the fact that there is a synchronized movement between the outer wing panels and the center wing section when adjusting the sweepback angle of the wings, a substantially neutral stability line is obtained, and the relative movements of the parts are so proportioned that such results are substantially achieved. It may be found, however, that after the sweepback angle has been adjusted and the relative movement of the center section has been accomplished, that further adjustment is desirable to bring the center of pressure and the longitudinal station of the center of gravity into proper relation. This is accomplished by means of the auxiliary motor which causes the screwjack 28 to be actuated to move the center wing section to the desired position whereby the aerodynamic balance of the airplane will be maintained.

While we have described in detail mechanism for carrying out our invention, it is obvious that certain modifications may be made without departing from the spirit of our invention or the scope of the appended claims, and we do not, therefore, wish to be limited to the exact embodiment herein shown and described.

What we claim is:

1. In an airplane, a fuselage, a center wing section mounted upon said fuselage to permit longitudinal movement thereof relative to the fuselage, wings having their root ends pivotally attached to said center section at points located between the leading and trailing edges of said wings, screwjack means having their outer ends connected to said wings at points opposite each other, curved wing tracks carried by said wings and arranged concentrically with the pivotal points thereof, bearings carried by said center section and engaging said wing tracks, actuating means carried by said center section and having connection with the inner ends of said screwjack means to cause said wings to be actuated about their pivotal points, and means for controlling the longitudinal movement of said center section relative to said fuselage.

2. In an airplane, a fuselage, a center wing section mounted upon said fuselage to permit longitudinal movement thereof relative to the fuselage, wings having their root ends pivotally attached to said center section at points located between the leading and trailing edges of said wings, screwjack means carried by said center section and having their outer ends connected to said wings at points opposite each other, actuating means carried by said center section and having connection with the inner ends of said screwjack means to cause said wings to be actuated about their points of pivotal attachment, and means associated with and controlled by said actuating means for moving said center section.

3. In an airplane, a fuselage, a center wing section slidably mounted upon said fuselage to permit longitudinal movement thereof relative to said fuselage, wings having their root ends pivotally attached to said center section at points located between the leading and trailing edges of said wings, screwjack means having their outer ends connected to said wings, actuating means carried by said center section and having connection with the inner ends of said screwjack means to cause said wings to be actuated about their pivotal points, separate screwjack means carried by said fuselage and having one end attached to said center section, and means connected to said actuating means for causing said last mentioned screwjack means to move said center section longitudinally.

4. In an airplane, a fuselage, a center wing section slidably supported by said fuselage for longitudinal movement thereof relative to said fuselage, wings having their root ends pivotally carried by said center section, a wing-actuating screwjack pivotally connected at its outer end to the root end of each wing, a wing transmission carried by said center section, means for connecting the inner ends of said screwjacks to said wing transmission, wing-sweep power means for actuating said wing transmission, a center section transmission carried by said center section, a center section screwjack having one end attached to said fuselage and the other end associated with said center section transmission, center section power means connected to said center section transmission for actuating said center section screwjack, and means connecting said transmissions and said power means whereby all of said screwjacks may be simultaneously actuated by said wing-sweep power means and whereby said center section screwjack may be independently actuated by said center section power means.

5. In an airplane, a fuselage, a center wing section slidably supported by said fuselage for longitudinal movement, wings having their root ends pivotally carried by said center section, a wing-actuating screwjack pivotally connected at its outer end to the root end of each wing, a wing transmission carried by said center section, means for connecting the inner ends of said wing-actuating screwjacks to said wing transmission, wing-sweep power means for actuating said wing transmission, a center section transmission carried by said center section, a center section screwjack having one end attached to said fuselage and the other end associated with said center section transmission, center section power means for actuating said center section transmission, and differential gear means connecting said wing screwjacks and said center section screwjack, whereby said wing-sweep power means will simultaneously actuate all of said screwjacks and said center section power means will independently actuate said center section screwjack.

6. In an airplane, a fuselage, a base member mounted upon said fuselage for movement longitudinally thereof, wings having their root ends pivotally connected to said base member at points located between the fore and aft edges of said wings, first actuating means operatively connected to said wings at points spaced longitudinally of said fuselage from said points of pivotal connection for actuating said wings about said points of pivotal connection, second actuating means connected to said first actuating means for simultaneously moving said base member, and means permitting operation of said second actuating means independently of said first actuating means.

7. In an airplane, a fuselage, a base member mounted upon said fuselage for movement longitudinally thereof, wings having their root ends pivotally connected to said base member at points located between the fore and aft edges of said wings, first actuating means located between the root ends of said wings near the leading edges thereof and operatively connected to said wings at points spaced longitudinally of said fuselage from said points of pivotal connection for actuating said wings thereabout, second actuating means connected to said first actuating means for simultaneously moving said base member, and means permitting operation of said second actuating means independently of said first actuating means.

8. In an airplane, a fuselage, a base member mounted upon said fuselage for movement longitudinally thereof, wings having their root ends pivotally connected to said base member at points located between the leading and trailing edges of said wings, actuating means operatively connected to each of said wings at a point spaced longitudinally of said fuselage from the point of pivotal connection of the wing to said base member for actuating said wings about said points of pivotal connection to alter the wing sweepback angle, and means for moving said base member longitudinally of said fuselage simultaneously with actuation of said wings about said points of pivotal connection, said last-named means being operable independently of such actuation of said wings for selectively moving said base member longitudinally of said fuselage without altering the wing sweepback angle.

9. In an airplane, a fuselage, a center wing section slidably mounted upon said fuselage, outer wing panels pivotally attached to said center section at a point between the leading and trailing edges of said outer wing panels, means including a first electric motor having a magnetic brake for moving said center wing section and simultaneously actuating said wing panels about their points of pivotal attachment to alter the wing sweepback angle a proportional amount, and means including a second electric motor having a magnetic brake for moving said center section independently of and without altering the adjustment of said wing sweepback angle.

10. In an airplane, a fuselage, a center wing section slidably mounted upon said fuselage, outer wing panels pivotally attached to said center section, means including a first electric motor having a magnetic brake for moving said center wing section and simultaneously actuating said outer wing panels about their points of pivotal attachment to alter the wing sweepback angle a proportional amount, means including a second electric motor having a magnetic brake for moving said center section, and differential gear means connecting said electric motors whereby they may each be operated independently of the other.

References Cited in the file of this patent

UNITED STATES PATENTS

| Number | Name | Date |
|---|---|---|
| 1,237,318 | Flink | Aug. 21, 1917 |
| 1,288,860 | Ferrari et al. | Dec. 24, 1918 |
| 1,501,530 | Driggs | July 15, 1924 |
| 1,793,349 | Andersson | Feb. 17, 1931 |
| 1,868,417 | Hill | July 19, 1932 |
| 2,074,897 | Everts | Mar. 23, 1937 |
| 2,376,636 | Thompson | May 22, 1945 |
| 2,410,239 | Roe | Oct. 29, 1946 |

FOREIGN PATENTS

| Number | Country | Date |
|---|---|---|
| 526,162 | Great Britain | Sept. 12, 1940 |
| 564,925 | Great Britain | Oct. 19, 1944 |